(12) United States Patent
Wolff

(10) Patent No.: US 6,401,660 B1
(45) Date of Patent: Jun. 11, 2002

(54) SELF-CLEANING CAT LITER BOX

(76) Inventor: Doug Wolff, 11975 Reed St., Suite 3, Broomfield, CO (US) 80020

( * ) Notice: Subject to any disclaimer, the term of this patent is extended or adjusted under 35 U.S.C. 154(b) by 0 days.

(21) Appl. No.: 09/892,428

(22) Filed: Jun. 28, 2001

(51) Int. Cl.[7] ............................................. A01K 29/00
(52) U.S. Cl. ..................... 119/165; 119/166; 119/168
(58) Field of Search .................................. 119/165, 166, 119/170, 168, 174

(56) References Cited

U.S. PATENT DOCUMENTS

| | | | | |
|---|---|---|---|---|
| 5,272,999 | A | * 12/1993 | Nussle | 119/166 |
| 5,365,883 | A | * 11/1994 | Laviolette | 119/170 |
| 5,394,833 | A | * 3/1995 | Glass | 119/166 |
| D363,369 | S | * 10/1995 | Hoth | D30/161 |
| 5,517,947 | A | * 5/1996 | Christman | 119/166 |
| 5,673,648 | A | * 10/1997 | Ayle | 119/166 |
| 5,690,051 | A | * 11/1997 | Fisher et al. | 119/166 |
| 5,749,318 | A | * 5/1998 | Barbot et al. | 119/166 |
| 5,785,000 | A | * 7/1998 | Barbary | 119/166 |
| 5,799,610 | A | * 9/1998 | Poulos | 119/166 |

* cited by examiner

*Primary Examiner*—Peter M. Poon
*Assistant Examiner*—Bethany L. Griles
(74) *Attorney, Agent, or Firm*—Edwin H. Crabtree; Ramon L. Pizarro; Donald W. Margolis

(57) ABSTRACT

A self-cleaning cat litter box for quickly and efficiently removing animal waste and reusing the unused cat litter, which has not been contaminated by the animal waste. The litter box is designed to lift cat defecation and clumped urination above the litter and discharge the waste into a disposable bag without having to touch the waste. The litter box includes at least one or more litter holding pans. The box also includes a litter strainer pan contoured for receipt inside the litter holding pan. The litter strainer pan includes a bottom with a plurality of litter openings for straining the unused litter therethrough and leaving the animal waste on top of the strainer bottom. Further, the box includes a strainer pan top for releasable attachment to the top of sides of the litter strainer pan. The strainer pan top includes a funnel disposed in one side of thereof for receiving the waste from the strainer bottom and discharging the waste into the disposable bag.

14 Claims, 2 Drawing Sheets

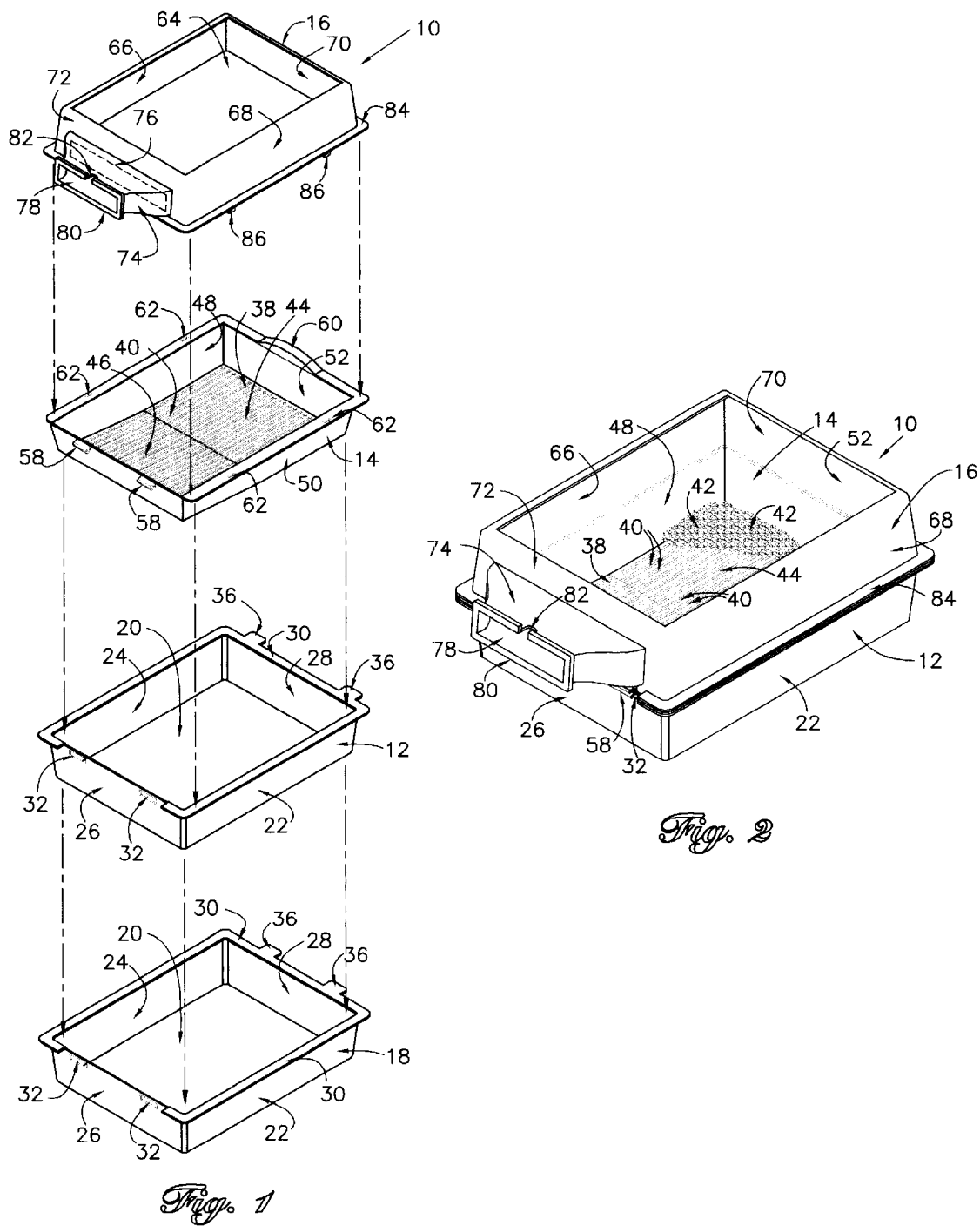

SELF-CLEANING CAT LITTER BOX

BACKGROUND OF THE INVENTION (a) Field of the Invention

This invention relates to litter boxes and more particularly, but not by way of limitation, to a cat litter box that is self-cleaning and efficient in removing animal waste from the litter box. The box also allows for the recycling of the litter left in the box and not contaminated by the waste.

(b) Discussion of Prior Art

Heretofore, there have been a variety of different types of patented animal litter boxes. In U.S. Pat. No. 5,893,336 to Vice et al., a litter box is disclosed having a sifter insert member. The insert member is used to remove solid and clumped waste. In U.S. Pat. No. 4,096,827 to Cotter, a portable suitcase style cat waste disposal unit is described. The disposal unit includes a pivotally mounted screen for removing waste from the cat litter in the unit. In U.S. Pat. Nos. 5,911,194 to Pierson, Jr., 5,823,137 to Rood et al. and U.S. Pat. No. 5,178,099 to Lapps et al., three different types of pivot sifting devices are disclosed for removing animal waste and clumped urine from a litter box.

None of the above mentioned animal litter boxes disclose the unique features, objects and advantages of the subject self-cleaning cat litter box as described herein.

SUMMARY OF THE INVENTION

In view of the foregoing, it is a primary objective of the subject invention to provide a cat litter box which is self-cleaning and easy to operate. The litter box is designed so that the animal waste can be quickly removed into a disposable bag without having to touch the waste.

Another object of the litter box is through the use of a litter strainer pan with litter openings therein, the litter can be strained. The strained litter that is reusable can be recycled for reuse.

The litter box includes at least one or more litter holding pans. Also, the box includes a litter strainer pan contoured for receipt inside the litter holding pan. The litter strainer pan includes a strainer bottom with a plurality of openings for straining the unused litter therethrough and leaving the animal waste on top of the strainer bottom. Further, the box includes a strainer pan top for releasable attachment to the top of sides of the litter strainer pan. The strainer pan top includes a funnel disposed in one side thereof for receiving the waste from the strainer bottom and discharging the waste into the disposable bag.

These and other objects of the present invention will become apparent to those familiar with different types of animal litter boxes and removal of animal waste when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is an exploded perspective view of the litter box illustrating a first holding pan positioned for receipt above and for fitting inside a second litter holding pan. A litter strainer pan is positioned for receipt above and for fitting inside the first holding pan. A strainer pan top is positioned for receipt above and attachment to the top of the litter strainer pan.

FIG. 2 is a perspective view of the litter box showing the litter strainer pan nested in the first litter holding pan. The strainer pan top is shown attached to the top of the litter strainer pan.

DESCRIPTION OF THE PREFERRED EMBODIMENTS

Figure 3:
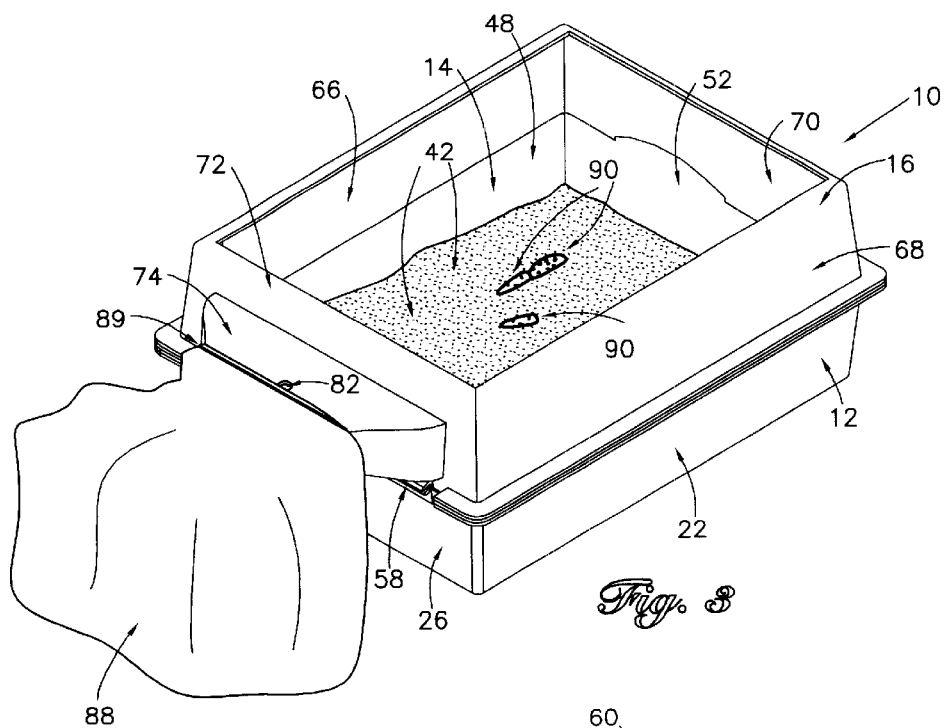
FIG. 3 is a perspective view of the litter box showing a disposable bag attached to the front of a funnel which is formed in one of the sides of the strainer pan top.

In FIG. 1, an exploded perspective view of the subject litter box is illustrated and having general reference numeral 10. The litter box 10 broadly includes a first litter holding pan 12, a litter strainer pan 14 and a strainer pan top 16, which is releasably attached to the top of the litter strainer pan 14. Also, the litter box 10 can include a second litter holding pan 18 for receiving the litter strainer pan 14 therein after cat litter has been strained in the first litter holding pan 12.

The first and second litter holding pans 12 and 18 are substantially the same and interchangeable. The two litter holding pans include an open top, a bottom 20, opposite sides 22 and 24, a front side 26 and a back side 28. A flange 30 extends around the top of the opposite sides 22 and 24, the back side 28 and a portion of the front side 26. The front side 26 of the pans includes a pair of spaced apart hinge openings 32. The flange 30 on the back side 28 of the first litter holding pan 12 includes a pair of outwardly extending release tabs 34. The two release tabs 34 are offset from a pair of outwardly extending release tabs 36 on the flange 30 of the back side 29 of the second holding pan 12. The offset release tabs 34 and 36 are used for quickly releasing the pans from each other when they are nested together or releasing the pans from the litter strainer pan 14.

Figure 4:
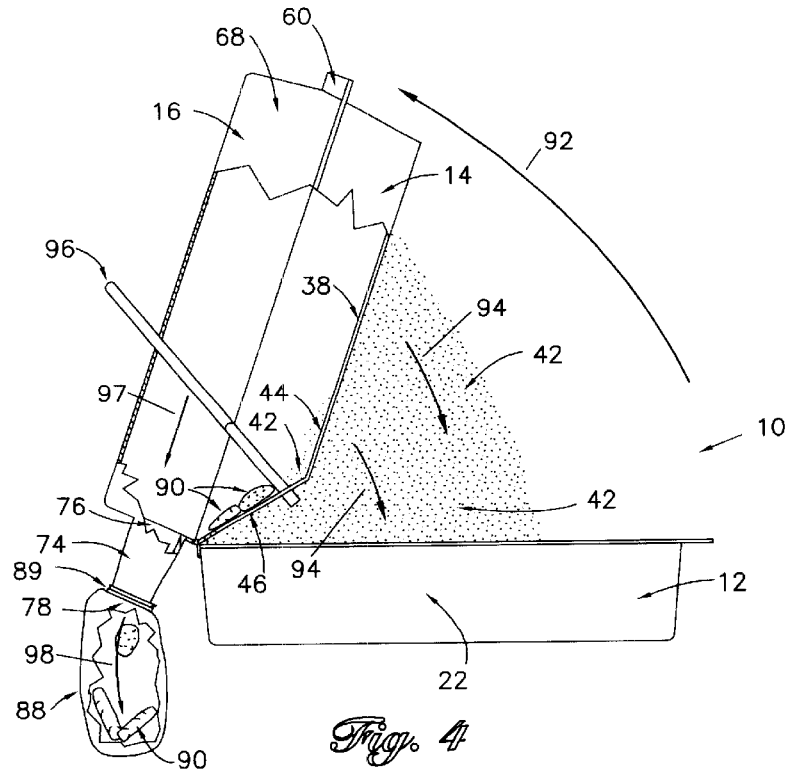
FIG. 4 is a side view of the strainer pan top and litter strainer pan in a raised position above the first litter holding pan. A portion of the pan top and the litter strainer pan is cut away to show a whisk or brush used for brushing the animal waste into the disposable bag.

The litter strainer pan 14, includes an open top, a bottom 38 having a plurality of parallel openings 40. The openings 40 are sufficient in size to allow the granules of cat litter 42 to fall therethrough. The cat litter 42 is shown in FIGS. 2–4. The openings 40 are typically ¼ inches in width and can be in a range of ⅛ to ⅜ inches, depending on the grain size of the litter 42. Parallel slats between the openings 40 are likewise in a range of ⅛ to ⅜ inches in width and are typically ¼ inches wide. A back portion 44 of the strainer pan 14 is horizontal, while a front portion 46 of the pan 14 is angled upwardly from the horizontal shown in a cut away view in FIG. 4. The angled front portion 46 is used to help move and direct the animal waste out of the litter box 10 as discussed under FIG. 4.

The strainer pan 14 also includes opposite sides 48 and 50, a back side 52 and a front side 54. A flange 56 is disposed around the top of the opposite sides 48 and 50 and the back side 52. A top of the front side 54 of the strainer pan 14 includes a pair of outwardly extending hinges 58 which are slidably received in the hinge openings 32 in the front side 26 of the first and second litter holding pans 12 and 18. The flange 56 on the top of the back side 52 of the strainer pan 14 has an upwardly curved handle 60. The handle 60 is used for gripping the litter strainer pan 14 and pivoting it upwardly on the hinges 58 allowing the unused litter 42 filter through the openings 40 into the bottom of the first litter holding pan 12 as shown in FIG. 4. The flange 56 along the opposite sides 48 and 50 of the strainer pan 14 include clip openings 62.

The strainer pan top 16 includes an enlarged opening 64 therethrough for pouring the cat litter 42 on top of the strainer pan 14, which is resting on top of the bottom 20 of either the first litter holding pan 12 or the second litter holding pan 18. The strainer pan top 16 also includes opposite sides 66 and 68, a back side 70 and a front side 72. The front side 72 includes an outwardly extending funnel 74 attached to or formed therein. The funnel 74 includes a large opening 76 inside the pan top 16 and a small opening 78 in the front of the pan top. The small opening 78 includes a flange 80 around its side. The flange 80 and funnel 74 include a small notch 82 in the top thereof for helping to grip and remove a rubber band or tie when used to secure an open end of a disposable bag attached to a portion of the funnel 74 as shown in FIGS. 3 and 4.

The pan top 16 also includes a flange 84 around the top of the opposite sides 66 and 68, the back side 70 and a portion of the front side 72. The opposite sides 66 and 68 include pairs of downwardly extending clips 86. The clips 86 are used for slidable receipt in the clip openings 62 in the top of the strainer pan 14 and releasably holding the strainer pan top 16 on top of the litter strainer pan 14. While the pan top 16 is shown herein as a separate unit, it can be appreciated that its structure and function can be incorporated into the strainer pan 14 forming a single unit without departing from the spirit and scope of the invention.

In FIG. 2, a perspective view of the litter box 10 is shown showing the litter strainer pan 14 nested inside the first litter holding pan 12. The strainer pan top 16 is shown releasably attached to the top of the litter strainer pan 14. In this view, the bottom 38 of the litter strainer pan 14, with openings 40, is shown resting on top of the bottom 20 of the first litter holding pan 12. The cat litter 42 is shown covering some of the back portion 44 of the bottom 38 of the strainer pan 14. In operation, the entire bottom 38 is covered with the cat litter 42.

In FIG. 3, another perspective view of the litter box 10 is illustrated with a disposable bag 88 having an open end received around the flange 80 in the front of the funnel 74. The sides of the open end of the bag 88 are secured around a portion of the funnel 74 using a rubber band 89. In this view, the bottom 20 of the first litter holding pan 12 and the bottom 38 of the litter strainer pan 14 is shown cover with the cat litter 42. On top of the litter 42 is animal waste 90 in clumps waiting to be removed from the litter box 10 and disposed inside the disposable bag 88.

In FIG. 4, a side view of the strainer pan top 16 and litter strainer pan 14 are shown in a raised position, as indicated by arrow 92, above the first litter holding pan 12. The pan top 16 and strainer pan 14 are raised using the handle 60 with the strainer pan 14 pivoting upwardly on the hinges 58 received in the openings 32 in the front side 26 of the holding pan 12. A portion of the strainer pan top 16 and the litter strainer pan 14 is cut away to illustrate the unused litter 42 being strained through the openings 40 and falling, as indicated by arrows 94, into the bottom of the first litter holding pan 12. Some of the litter 42 has been clumped with the animal waste 90 and a whisk 96, a brush or the like is used to move the waste into the large opening 76 of the funnel 74. The movement of the whisk 96 is indicated by arrow 97. The waste 90 then drops, as indicated by arrow 98, into the disposable bag 88. When all of the waste has been received in the disposable bag from the top of the strainer pan 14, the rubber band 89 is removed from around the open end of the bag 88 and the funnel 74. The bag 88 is then removed from the end of the funnel 74 and thrown away in a convenient trash receptacle.

It should be note, that after the litter box 10 has been cleaned, the unused litter 42 can be poured from the first litter holding pan 12 into a separate container and the strainer pan 14 again placed on the bottom 20 of the first litter holding pan 12. Or, the strainer pan 14 can be placed on the bottom 20 of the second litter holding pan 18 and the unused litter poured on top of the strainer pan 14 inside the second holding pan 18. In this example, the second litter holding pan 18 replaces the first litter holding pan 12 and the two pans 12 and 18 can be used interchangeably and can be alternately used every time the litter box 10 needs to be cleaned.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A cat litter box for quickly and efficiently removing animal waste and discharging the waste into a disposable bag, the litter box providing for recycling unused cat litter, the litter box comprising:

a first litter holding pan, said first litter holding pan having an open top, sides and a bottom;

a second litter holding pan, said second litter holding pan having an open top, sides and a bottom, said second litter holding pan identical in size and shape with said first litter holding pan;

a litter strainer pan contoured for receipt inside said first or second litter holding pan and pivotally attached thereto, said litter strainer pan having a strainer bottom received on top of the bottom of said first or second litter holding pan, the stainer bottom having a plurality of openings along a length thereof for straining the unused litter therethrough and leaving the animal waste on top of the strainer bottom; and a strainer pan top having an open top and sides attached to the top of sides of said litter strainer pan, said strainer pan top having a funnel disposed in one side thereof for receiving the waste from the strainer bottom and adapted for discharging the waste into the disposable bag;

whereby, when said litter strainer pan is received inside said first litter holding pan and the cat litter is poured thereon and then later said litter strainer pan is pivoted upwardly for discharging the animal waste into said funnel, the litter strainer pan is then placed inside said second litter holding pan, the unused cat litter from said first litter holding pan is then poured on top of said litter strainer pan.

2. The litter box as described in claim 1 wherein said strainer pan includes a pair of hinges in a side thereof, said hinges slidably received in a pair hinge openings in a side of said first litter holding pan or in a pair of hinge openings in a side of said second litter holding pan.

3. The litter box as described in claim 1 wherein a portion of said strainer pan is angled upwardly from the horizontal toward an opening in said funnel.

4. The litter box as described in claim 1 wherein a portion of the bottom of said strainer pan includes a horizontal back portion and a front portion angled upwardly from the horizontal toward an opening in said funnel.

5. The litter box as described in claim 4 wherein the back and front portion of the bottom of said strainer pan include a plurality of parallel openings with slats between the openings, the opening and slats disposed along the length of the bottom, the openings and slats having a width in a size range of ⅛ to ⅜ inches.

6. The litter box as described in claim 1 wherein the bottom of said strainer pan includes a plurality of parallel openings along the length of the bottom.

7. The litter box as described in claim 1 wherein said litter strainer pan includes an upwardly extending handle for raising said litter strainer pan above said first and second litter holding pans.

8. A cat litter box for quickly and efficiently removing animal waste and discharging the waste into a disposable bag, the litter box providing for recycling unused cat litter, the litter box comprising:

a first litter holding pan, said first litter holding pan having an open top, sides, a bottom and a pair of first hinge openings in a side thereof;

a second litter holding pan, said second litter holding pan having an open top, sides, a bottom and a pair of second hinge openings in a side thereof, said second litter holding pan identical in size and shape with said first litter holding pan;

a litter strainer pan contoured for receipt inside said first or second litter holding pan and pivotally attached thereto, said litter strainer pan having a strainer bottom received on top of the bottom of said first or second litter holding pan, the strainer bottom having a plurality of openings along a length thereof for straining the unused litter therethrough and leaving the animal waste on top of the strainer bottom, said litter strainer pan having a pair of hinges in a side thereof, said hinges slidably received in said first hinge openings in said first litter holding pan and in said second hinge openings in said second litter holding pan; and a strainer pan top having an open top and sides attached to the top of sides of said litter strainer pan, said strainer pan top having a funnel disposed in one side thereof for receiving the waste from the strainer bottom and adapted for discharging the waste into the disposable bag;

whereby, when said litter strainer pan is received inside said first litter holding pan and the cat litter is poured thereon and then later said litter strainer pan is pivoted upwardly for discharging the animal waste into said funnel, the litter strainer pan is then placed inside said second litter holding pan, the unused cat litter from said first litter holding pan is then poured on top of said litter strainer pan.

9. The litter box as described in claim 1 wherein a portion of said strainer pan is angled upwardly from the horizontal toward an opening in said funnel.

10. The litter box as described in claim 8 wherein a portion of the bottom of said strainer pan includes a horizontal back portion and a front portion angled upwardly from the horizontal toward an opening in said funnel.

11. The litter box as described in claim 10 wherein the back and front portion of the bottom of said strainer pan include a plurality of parallel openings with slats between the openings, the opening and slats disposed along the length of the bottom, the openings and slats having a width in a size range of ⅛ to ⅜ inches.

12. The litter box as described in claim 8 wherein the bottom of said strainer pan includes a plurality of parallel openings along the length of the bottom.

13. The litter box as described in claim 8 wherein said litter strainer pan includes an upwardly extending handle for raising said litter strainer pan above said first and second litter holding pans.

14. A cat litter box for quickly and efficiently removing animal waste and discharging the waste into a disposable bag, the litter box providing for recycling unused cat litter, the litter box comprising.

a first litter holding pan, said first litter holding pan having an open top, sides, a bottom and a pair of first hinge openings in a side thereof;

a second litter holding pan, said second litter holding pan having an open top, sides, a bottom and a pair of second hinge openings in a side thereof, said second litter holding pan identical in size and shape with said first litter holding pan;

a litter strainer pan contoured for receipt inside said first or second litter holding pan and pivotally attached thereto, said litter strainer pan having a strainer bottom received on top of the bottom of said first or second litter holding pan, the strainer bottom having a plurality of parallel openings along a length thereof for straining the unused litter therethrough and leaving the animal waste on top of the strainer bottom, the plurality of parallel openings having slats therebetween, the opening and slats disposed along the length of the bottom, the openings and slats having a width in a size range of ⅛ to ⅜ inches, said litter strainer pan having a pair of hinges in a side thereof, said hinges slidably received in said first hinge openings in said first litter holding pan and in said second hinge openings in said second litter holding pan, said litter strainer pan having a horizontal back portion and a front portion angled upwardly from the horizontal; and a strainer pan top having an open top and sides attached to the top of sides of said litter strainer pan, said strainer pan top having a funnel disposed in one side thereof for receiving the waste from the strainer bottom and adapted for discharging the waste into the disposable bag;

whereby, when said litter strainer pan is received inside said first litter holding pan and the cat litter is poured thereon and then later said litter strainer pan is pivoted upwardly for discharging the animal waste into said funnel, the litter strainer pan is then placed inside said second litter holding pan, the unused cat litter from said first litter holding pan is then poured on top of said litter strainer pan.

* * * * *